(12) United States Patent
Brinz et al.

(10) Patent No.: US 7,911,218 B2
(45) Date of Patent: Mar. 22, 2011

(54) DEVICE AND METHOD FOR ANALYZING A SAMPLE PLATE

(75) Inventors: Thomas Brinz, Bissingen (DE); Ulrich Simon, Aachen (DE); Jörg Jockel, Gerlingen (DE); Daniel Sanders, Aachen (DE)

(73) Assignee: Robert Bosch GmbH, Stuttgart (DE)

( * ) Notice: Subject to any disclaimer, the term of this patent is extended or adjusted under 35 U.S.C. 154(b) by 1037 days.

(21) Appl. No.: 10/582,122

(22) PCT Filed: Nov. 18, 2004

(86) PCT No.: PCT/DE2004/002539
§ 371 (c)(1),
(2), (4) Date: Feb. 20, 2007

(87) PCT Pub. No.: WO2005/061093
PCT Pub. Date: Jul. 7, 2005

(65) Prior Publication Data
US 2007/0159207 A1 Jul. 12, 2007

(30) Foreign Application Priority Data
Dec. 22, 2003 (DE) .................................. 103 61 099

(51) Int. Cl.
*G01R 35/00* (2006.01)
(52) U.S. Cl. ................................................. 324/762.01
(58) Field of Classification Search ........... 324/754–765
See application file for complete search history.

(56) References Cited

U.S. PATENT DOCUMENTS

| | | | |
|---|---|---|---|
| 4,968,931 A * | 11/1990 | Littlebury et al. | 324/760 |
| 5,854,092 A * | 12/1998 | Root et al. | 438/106 |
| 5,925,355 A | 7/1999 | Chatterjee et al. | |
| 6,181,144 B1 * | 1/2001 | Hembree et al. | 324/754 |
| 6,300,778 B1 | 10/2001 | Frederickson et al. | |
| 6,468,098 B1 * | 10/2002 | Eldridge | 439/197 |
| 6,838,896 B2 * | 1/2005 | Leedy | 324/760 |
| 2003/0070917 A1 | 4/2003 | Giaquinta et al. | |
| 2003/0122567 A1 * | 7/2003 | Miller | 324/765 |
| 2003/0134987 A1 | 7/2003 | Jang et al. | |
| 2004/0017185 A1 * | 1/2004 | Song et al. | 324/158.1 |
| 2005/0127931 A1 * | 6/2005 | Karlinsey et al. | 324/760 |
| 2007/0132469 A1 * | 6/2007 | Yano | 324/760 |

FOREIGN PATENT DOCUMENTS

| | | |
|---|---|---|
| DE | 101 31 581 | 3/2002 |
| WO | WO 00/36410 | 6/2000 |
| WO | WO 03/073089 | 9/2003 |

* cited by examiner

*Primary Examiner* — Ha Tran T Nguyen
*Assistant Examiner* — Joshua Benitez
(74) *Attorney, Agent, or Firm* — Kenyon & Kenyon LLP

(57) ABSTRACT

A device and a method are provided for the analysis of a sample plate on which at least two material samples are situated. In the method, one impedance spectrum is measured for each of the material samples. As a function of the respectively measured impedance spectrum, a configuration of a circuit equivalent is determined which includes at least one electronic component. Then, for an error minimization computation, starting values for the components of the respective circuit equivalents are determined. In the error minimization computation, a theoretical impedance spectrum is calculated for at least one of the material samples, based on the impedance spectrum measured for the material sample, as well as the starting values for the components of the respective circuit equivalent, and fit values are determined for the components of the respective circuit equivalent. Subsequently, a validation variable is determined for the calculated, theoretical impedance spectrum, and an evaluation variable is ascertained by comparison of at least one of the fit values for the components to a reference value.

26 Claims, 11 Drawing Sheets

DEVICE AND METHOD FOR ANALYZING A SAMPLE PLATE

FIELD OF THE INVENTION

The present invention relates to a device for the analysis of a sample plate containing material samples, well as a method for analyzing the sample plate.

BACKGROUND INFORMATION

It is of major importance, particularly in the field of material sciences, chemistry and pharmacy, to discover and develop optimized substances and materials with respect to desired cases of application. In this connection, sensor systems represent a special field of application, which are a key technology having a steadily growing number of applications, both in industry and in the private sector. Sensors are used, for example, in technical process monitoring, in the area of environmental protection, in the field of medicine and in the motor vehicle field. A considerable quantity of development work is currently being put especially into the development of faster and highly sensitive sensors having a low cross-sensitivity.

As a rule, up until now, the developments were limited to optimization or modification of known materials. However, there is the problem that, for certain areas of application of the sensor systems, there is a requirement for new materials which cannot be sufficiently covered by conventional methods which are distinguished by the production of individual sensors and a subsequent sequential characterization.

In particular, in the development of new types of sensitive materials or material combinations, it may be expedient to use methods from the field of combinatorial chemistry or so-called high throughput methods. In these methods, parallelized synthesis methods and screening methods are involved, by which new materials and material combinations may be discovered, or known synthesis methods for existing materials may be optimized in a broad field of parameters.

A general representation of high throughput methods is described in U.S. Pat. No. 5,925,355, in which document the application of combinatorial chemistry, known in the field of pharmacy, to chemical and material science application areas is proposed.

A device for analyzing a sample plate is described, for example, in published German patent document DE 101 31 581. This device includes a sample plate on which 64 material samples have been applied in matrix fashion, which, in each case, are connected to two electrodes that, in turn, are provided with contact locations to which a means for reversible and addressable contacting to the installation may be brought.

SUMMARY

The device according to the present invention for analyzing a sample plate has a measuring head that may be positioned in a housing carrier, which measuring head includes two measuring wires per material sample for the electrical connection to the contact means, which lie against contact surfaces of the sample plate in a prestressed manner and are connected to a measuring unit and an evaluation unit. The device according to the present invention has the advantage of being simple to handle, since, in the use of a normalized sample plate, the contact between the material samples and the measuring unit and evaluation unit is able to be produced by simply setting the measuring head into the housing carrier.

The device according to the present invention is particularly suitable for developing and discovering materials or material combinations that may be used as sensor materials, and may be characterized by their electrical properties. For example, the device according to the present invention may be used for developing an optimized sensor material of a gas sensor.

Using the device according to the present invention, it is possible to almost simultaneously investigate a large number of potential sensor materials, disposed on the sample plate, under various test gases at different temperatures, which may amount to up to 800° C. The investigation may be made by potentiometric, resistive, capacitative methods and also by complex impedance spectroscopy.

The concept of spectroscopy should be understood, in this case, as involving frequency-dependent measurements, that is, the impedance of a sample is investigated at different measuring frequencies. For example, the individual material samples are tested in each case in a frequency range between 10 Hz and $10^7$ Hz at a measuring data density of 15 measuring points per decade. This means that, per material sample, 180 measured data are ascertained at such a measuring data density. A far-reaching data reduction may be achieved, for instance, by the adaptation of a suitable circuit equivalent to the measured data.

In order to hold the measuring wires which lie against the contact surfaces of the sample plate via a fusion ball, with prestressing, the measuring wires may each be connected to an especially gilded spring contact, which will ensure a constant contact pressure of the respective measuring wire against the respective contact surface.

In order to be able to apply a certain test gas to the material samples, for the development of a gas sensor, the measuring head may be connected to a gas supply unit.

In order to be able to expose the material samples to different test gas atmospheres or reference gas atmospheres, the gas supply unit, which is expediently connected to a data processing unit of the measuring and evaluation unit, includes a gas mixing device. Furthermore, the gas supply unit may include a water reservoir for moistening the test gas atmosphere or reference gas atmosphere.

Furthermore, the measuring head may be designed in such a way that it includes a gas chamber, as an integrated component, that is situated above the material samples of the sample plate and is formed by an essentially bell-shaped distributing device. The gas chamber is connected to the gas supply unit.

In order to achieve a homogeneous distribution of the test gas or the reference gas in the gas chamber, in one advantageous example embodiment of the device according to the present invention, a diffuser is disposed in the gas chamber.

In the case of a plurality of material samples on the sample plate, in order to be able to measure the individual material samples in a simple manner, the measuring and evaluation unit advantageously includes two relay switch panels that are connected to the measuring wires, and, for example, in the case of 64 material samples on the sample plate, each have a 3×64 matrix of relays appropriate for high frequency. In this case, the 64 material samples on the sample plate are able to be measured in a measuring cycle, at least three measuring variables being accessible, namely, for example, the impedance via an impedance analyzer and direct current resistances of the material samples via additional appropriate measuring devices and their current/voltage characteristics curves.

The measuring and evaluation unit is expediently equipped with a measuring and control software, which, on the one hand, controls the measuring progress and, on the other hand, passes along the measured data obtained to an appropriate data file or even to a relational databank, which may be read in by an evaluation software.

The evaluation software works in such a way that it includes a fit functionality for computing theoretical impedance spectra for the individual samples, the computation being made based on a circuit equivalent that includes at least one virtual or real electronic component. A virtual component is, for instance, a constant phase element (CPE). Thus, the fit functionality computes, based on the measured data for a circuit equivalent made up, for example, of a serial RC element, a theoretical impedance spectrum approximated as well as possible to a measured impedance spectrum, a variation of the capacitance and/or the resistance of the components of the RC element being carried out for the adaptation of the theoretical to the measured spectrum. Thus, in this case, a resistance value and a capacitance value for the RC element are assigned to the theoretical impedance spectrum that is adapted as well as possible. From the resistance value, for example, one may draw conclusions on the sensitivity of the respective material sample by comparing it to a reference value.

In the case of a plurality of material samples, which are measured under various measuring conditions, in order to make accessible to a simple evaluation the output values obtained for the individual material samples representing, for instance, the sensitivities, the evaluation software advantageously includes a data-mining functionality. The data-mining functionality determines the optimal material sample for the respective application case by a numerical path, for instance, by advantageously applying multi-dimensional object functions.

Alternatively, or in addition, the data-mining functionality may also include a visualization functionality. In this case, a user is able to determine the optimal material sample for the respective application case, supported by a video screen. For instance, the visualization functionality works with a color spectrum, one certain color having a high sensitivity of the material sample assigned to it and another color having a lower sensitivity assigned to it.

In order to be able also to discover sensor materials that are suitable for application cases in which, such as for instance in exhaust gas, where high temperatures prevail, the device according to the present invention has a heating device into which the sample plate may be immersed. In this case, the device especially has a high temperature reactor that is bordered by the heating device, and in which the sample plate that includes the material sample may have applied to it different test gases or reference gases.

The present invention also provides a method for analyzing a sample plate. By applying this method, it is possible electrically to measure, under different conditions, a sample plate on which a large number of material samples, for instance, 64 material samples are disposed, and to select in a fully automatic fashion a material sample best suited to the application case. This takes place by an automatic selection of starting values for the components of the respective circuit equivalents and the subsequent error minimization computation. The starting values are applied in the error minimization computation, and starting from the starting values, a theoretical impedance spectrum, adapted to the respectively measured impedance spectrum, for the respective material sample being calculated under the respective measuring conditions. By this procedure, a considerable data reduction is made possible, since, starting from the impedance spectra which have a plurality of measuring points, few fit values representing derived variables are ascertained that describe the individual components of the circuit equivalents. The fit values thus represent dimensionings of the components of the circuit equivalents, using which the measured impedance spectrum may be simulated as best as possible.

In the determination of the circuit equivalents, for example, a serial connection of four RC elements may be selected, the higher RC elements, if necessary, being set to a starting value that has no influence on the computation of the theoretical impedance spectrum.

The starting values of an RC element, required for the error minimization computation, are computed from the maximally measured, imaginary impedance Z"_MAX and the corresponding measured frequency f_Z"_MAX, according to the following formulas:

$$R1\_START = -2 \cdot Z''\_MAX$$

$$C1\_START = \frac{1}{2\pi \cdot f\_Z''MAX \cdot R\_START}.$$

If the circuit equivalent includes several RC elements, the starting values for the error minimization computation required for the higher RC elements are ascertained from the difference spectra between the measured data and data which are computed or simulated based on the starting values computed for the first RC element.

In particular, the selection of so-called "good" starting values, which are close to the actual variables of the components of the circuit equivalent, decisively shortens the duration of the subsequent error minimization computation. "Bad" starting values, on the other hand, may lead to the error minimization computation, carried out based on the starting values, yielding meaningless values.

In one example embodiment of the method according to the present invention, the circuit equivalent for the simulation of impedance spectra, based on fit values obtained in response to an error minimization computation, is made up of a serial separation of four RC elements. By the determination of starting values for the individual components, it is then determined, in the light of a threshold value, how many RC elements are taken into consideration in the simulation computations. The threshold value is a value that may be preset by a user. The percentage ratio of the resistance of the first RC element to the resistance of the current RC element n is checked according to the formula $$RCn\_START > Wert[\%] \cdot RC1\_START.$$

The variable "value" is the variable, changeable by the user, which, for instance, is preset to 10%. If the argument is not satisfied, the starting values for the components of the respective RC element are set to values that have no influence on a simulation of the impedance spectra. These values are kept constant in the error minimization computation.

Furthermore, in the method, the validation variable is determined which evaluates the agreement between the calculated, theoretical impedance spectrum and the respectively assigned, measured impedance spectrum.

The evaluation quantity represents the output value relevant to the respective analysis which, for example, in the determination of a sensor material for a gas sensor, reflects a sensitivity of the respective material sample. The sensitivity is a measure for the quality of a sensor.

The sensitivity of a resistive gas sensor may be defined in various ways. If, for instance, one takes into consideration the direction of the change of the resistances during the application of gas, a sensitivity S may be expressed as the quotient of the resistance R_TEST under a test gas atmosphere and the resistance R_0 under reference conditions, as follows $$S = -\frac{R\_TEST}{R\_0}; \text{ for oxidizing gases}$$

$$S = +\frac{R\_0}{R\_TEST}; \text{ for reducing gases}$$

The sign of sensitivity S gives information with regard to the resistance change.

Alternatively, the sensitivity may be described as a change in the resistances, namely, according to the formulas $$S\_\Delta = -\frac{R\_TEST - R\_0}{R\_TEST}; \text{ for oxidizing gases}$$

$$S\_\Delta = +\frac{R\_0 - R\_TEST}{R\_0}; \text{ for reducing gases.}$$

These formulas yield sensitivities $S\_\Delta$ between −1 and 1, that is, normalized sensitivities.

It is also possible-to mutually convert the sensitivities of the two definitions into each other. The sensitivity expressed by the value S is especially meaningful in the case of a large change of the resistance of a material sample that results from the application of a test gas. The sensitivity expressed by $S\_\Delta$ is particularly meaningful if the resistance of a material sample changes only a little as a result of the application of a test gas. However, the sensitivity expressed by $S\_\Delta$ has the advantage of a large tolerance with regard to measuring accuracies, a precise illumination of a region of small resistance changes, and therewith a better valuation of cross-sensitivities, as well as the possibility of an automated visualization and data processing.

In one example embodiment of the method according to the present invention, the circuit equivalent is made up of a virtual arrangement of real electronic components such as capacitors and resistors. In its simplest embodiment, the circuit equivalent is composed of one resistor.

By the error minimization computation, in which an adaptation of the variables of the components to the measured data takes place, a simulated impedance spectrum is determined for the circuit equivalent for the respective material sample. From the adapted variables of the components, one is able to draw conclusions on the electrical properties of the processes in the material sample described by the circuit equivalent. If the electrical behavior of the material sample is determined by several processes of different relaxation times, it is necessary to draw upon complicated circuit equivalents which, for instance, are made up of several RC elements connected in series. If the processes react differently to a variation of the measuring conditions, one may undertake an assignment of individual processes to components or groups of components so that the individual processes may be analyzed separately. Because of the error minimization computation, the data volume for the description of the impedance measurement is reduced to the arrangement and the magnitudes of the components.

In the case of a sample plate having, for example, 64 material samples and a measurement under eleven different gas atmospheres at four different temperatures in each case, the quantity of measured data is approximately 2816 impedance spectra. In the method according to the present invention, the individual impedance spectra are simulated and in each case reduced to the derived measured variables that are reproduced by the variables of the components of the circuit equivalent.

The computation of a theoretical impedance spectrum of a circuit equivalent is made in one example embodiment of the method according to the present invention in such a way that a complex admittance Y* and a phase shift φ of the individual components of the RC elements are determined at a given angular frequency ω (2Π measuring frequency) according to the following formulas:

$$Y^* = \sqrt{\left(\frac{1}{R}\right)^2 + (\omega C)^2}$$

$$\phi = \arctan(\omega RC)$$

$$Y' = \cos\phi$$

$$Y'' = \sin\phi$$

The respective impedances may be assessed by a transformation:

$$Z' = \frac{Y'}{Y'^2 + Y''^2}, \quad Z'' = \frac{Y''}{Y'^2 + Y''^2},$$

where Z' is the real part of the impedance and Z'' is the imaginary part of the impedance.

By a serial connection of the RC elements, the impedances of the individual RC elements may be summed directly. A calculation of the impedances for frequencies that correspond to the measured frequencies yields a data set corresponding to the measured data, so that an error estimation between the measured data set and the theoretically determined data set is possible.

The error minimization computation carried out in the method according to the present invention is carried out in one advantageous embodiment by variation of the variables of the individual components by 1%. An error may be determined by analysis of the differences between the theoretically calculated spectra and the measured ones. If, after a variation, an error decreases, a renewed variation is carried out for the same component of the circuit equivalent, and, based on this variation, a theoretical impedance spectrum is computed, using which a new error calculation is carried out. If the error does not decrease, the variation that has taken place is reversed, and the variation of the components having the opposite sign is varied, or another component is varied.

The error computation is carried out in such a way that the function for determining the error takes into account the starting value of the resistance of the first RC element. If the value is greater than a nominal measured resistance of the impedance analyzer used in the measurement, for instance, greater than $3 \cdot 10^7$ Ω, the error is determined only from the imaginary part of the calculated impedance. In order to be able to weight the high-frequency range of the ascertained spectrum, the ascertained deviations are multiplied by the logarithm of the measured frequency. This weighting makes it possible to suppress physically meaningless or even erroneous measured data in the low-frequency range.

For the calculation of the validation variable, that is, for the validation of the quality of the theoretically calculated impedance spectrum for the respective material sample, e.g., a corridor is determined about the theoretical impedance spectrum which contains, for example, 90% of the measured data. In order to minimize the time required for the computation of the validation variable, a successive approximation algorithm may be used for this, the boundary values of the algorithm 0 Ω and of the double values of the real parts of the summed impedance may be at the smallest measured frequency.

The method according to the present invention may be used for the analysis of material samples under various test gas atmospheres and especially at various temperatures. In this case, impedance spectra are measured under various measuring conditions for all material samples situated on the sample plate.

In the method according to the present invention, the respectively measured spectra are then each simulated in a theoretical manner by an error minimization computation based on a circuit equivalent. This results in a large quantity of evaluation magnitudes which represent the target variables in the method.

In the method according to the present invention, the target variables or the evaluation variables are written into a databank and evaluated using a datamining functionality.

As far as the databank is concerned, which is used for receiving and making available data sets, expediently a relational databank is involved in which the data are filed in the form of tables, ordered according to thematic areas. Relationships between the individual data sets in the tables are produced by so-called identification keys.

The databank may, for example, include additional properties of the material samples, such as the synthesis conditions of their starting materials, their sampling history and the like. These properties are linked with one another via table relationships.

The data-mining may be performed using a possibly multi-dimensional target function and/or using a visual data-mining functionality. Data-mining, carried out using a target function, is a numerical method which is based on the individual evaluation variables which are stored in the databank, for instance, classified according to measuring temperature and test gas. In this context, it is first specified which properties are wanted of the material being sought. For instance, in the search for a sensor material for a gas sensor it may be stated with respect to which gas the sensor material is to be sensitive, and which cross-sensitivities could have an interfering effect. Thus, from this there develops a demand profile for a fingerprint of the sensitivities.

The visual data-mining functionality advantageously works in such a way that the evaluation variables of the material samples of the sample plate are represented broken down, for instance, according to test gases and temperatures.

In the use of the device according to the present invention and the method according to the present invention, one has a fully automatic high-throughput impedance system using which new materials having a high sample throughput and a low time expenditure and cost expenditure are able to be developed. Thus, for example, by using the system on two days, 64 different material samples may be investigated and also evaluated at four different temperatures and under eleven different test gas atmospheres, with regard to their sensoric properties.

In particular, the system may be used for general material development and especially for the development of sensors in the motor vehicle field and in the safety technology field.

The present invention also encompasses data processing equipment having a data processing program as subject matter, for implementing the method according to the present invention.

DETAILED DESCRIPTION

Figure 1:
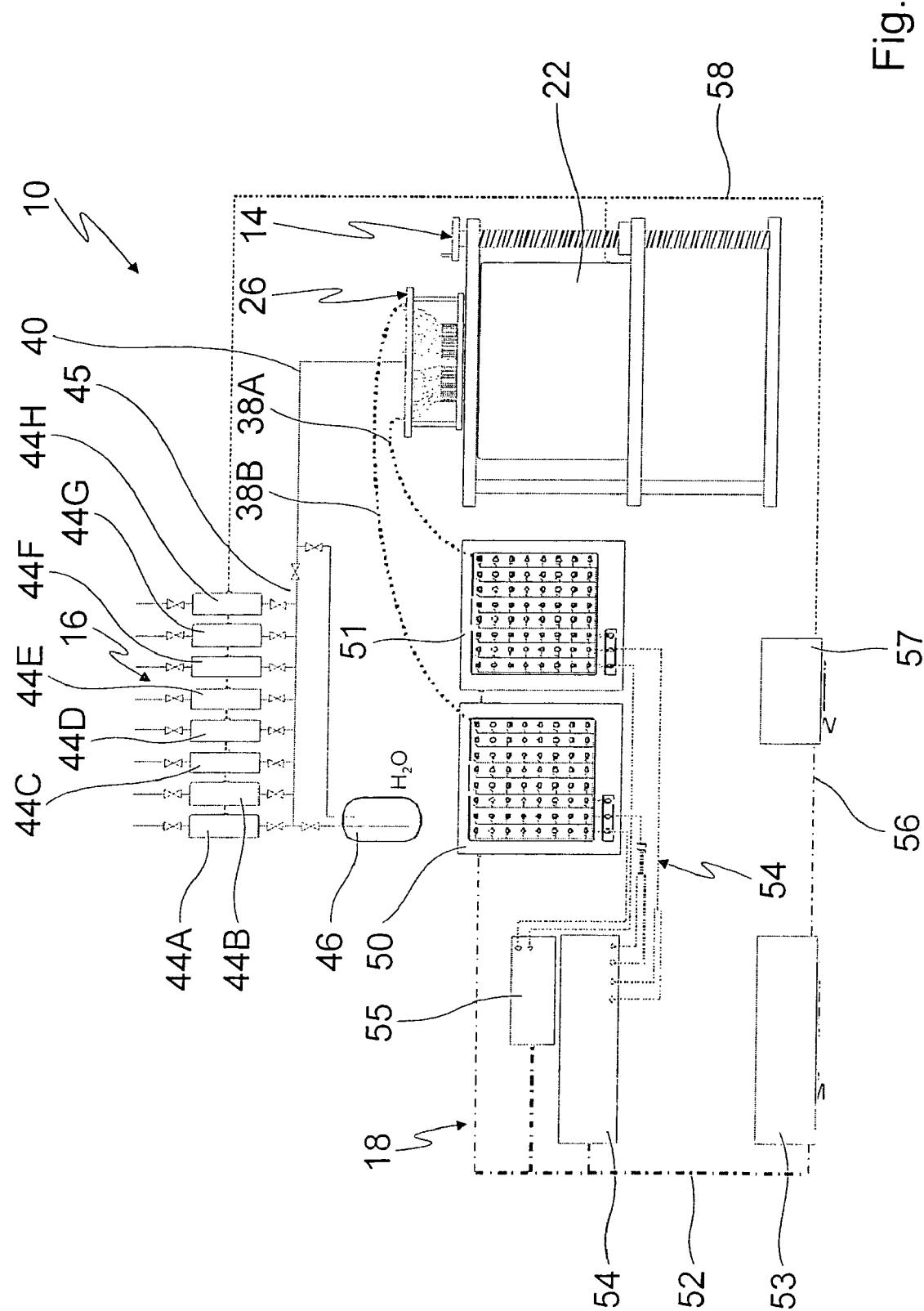
FIG. 1 shows a test setup of a device according to the present invention.

In FIGS. 1 through 4, a test setup is shown of a device 10, for analyzing a sample plate 12, on which 64 material samples 13 are situated. Device 10 includes a high temperature reactor 14, a gas supply unit 16 and a measuring and evaluation unit 18.

Figure 2:
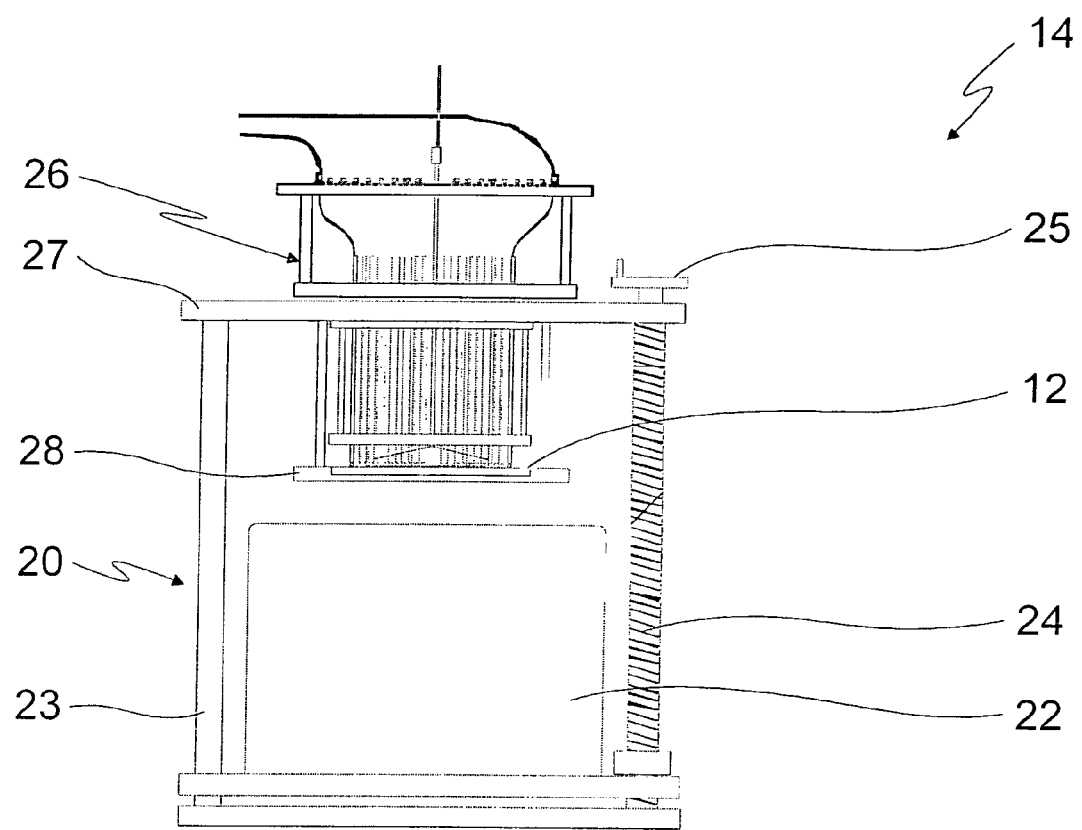
FIG. 2 shows a measuring appliance of the device according to FIG. 1.
Figure 3:
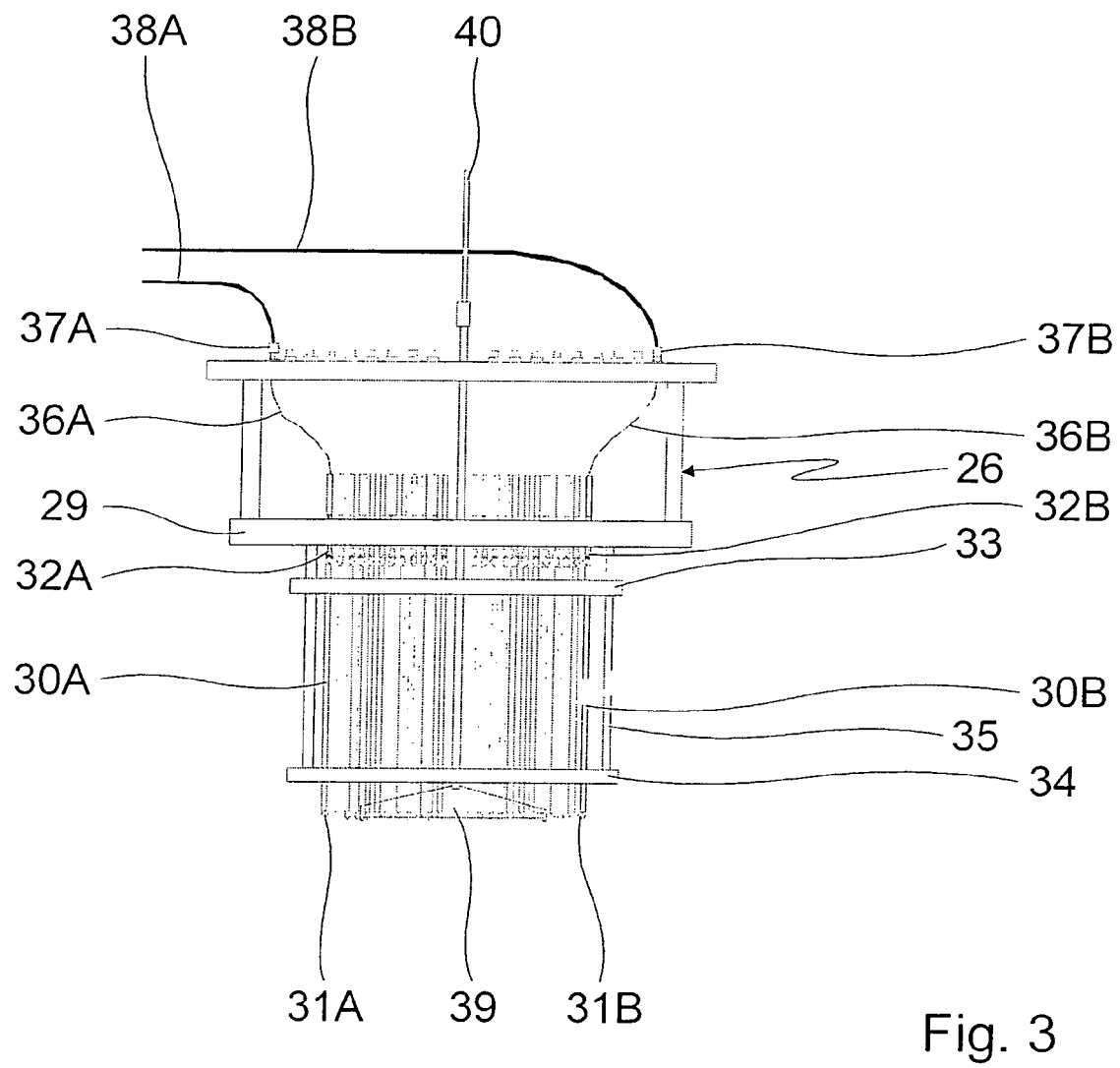
FIG. 3 shows a measuring head of the measuring device according to FIG. 2.
Figure 4:
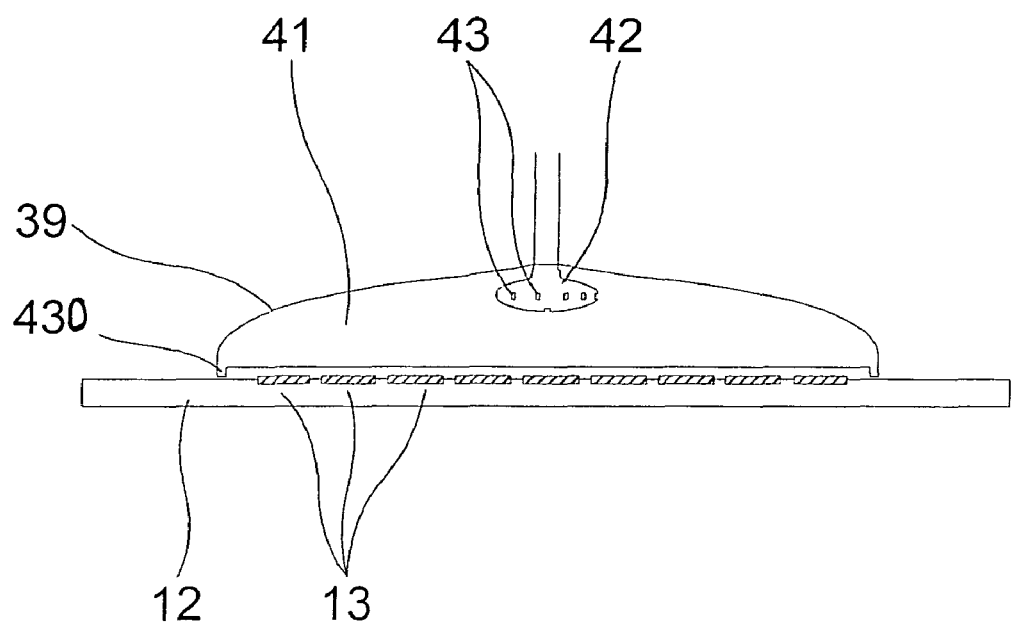
FIG. 4 shows a gas distribution device of the measuring head as in FIG. 3.

High temperature reactor 14, which is shown in more detail especially in FIGS. 2 through 4, includes a frame or housing 20, in which an adjustable-height heating block 22 is situated, which is supported on a guide rod 23 and a threaded rod 24 that is provided with a crank 25.

Heating block 22, which is made up, for instance, of four heating plates that border on a heating chamber, having a heating power of 1100 W each, is adjustable in height in such a way that plate carrier 28, and thus sample plate 12, may be immersed into the heating chamber.

Furthermore, high temperature reactor 14 includes a measuring head 26 which is set into measuring head carrier 27 that is connected to frame 20, and is used for contacting the 64 material samples 13 situated on sample plate 12 to measuring and evaluation unit 18. Sample plate 12 is situated on a plate carrier 28 that is connected to measuring head carrier 27.

Measuring head 26, which is particularly shown in FIG. 3, includes a ground plate 29, which is formed, for example, from a workable glass ceramic and is used as a mounting support of 128 measuring wires 30A, 30B, that are each made of platinum and are sheathed by an aluminum oxide tube. At their lower ends, measuring wires 30A, 30B each have a fusion ball 31A, 31B which are used for contacting each measuring wire to a contact surface of sample plate 12. Sample plate 12 has two contact surfaces per material sample, i.e., in the present case altogether 128 contact surfaces, which each collaborate with one of measuring wires 30A, 30B. Measuring wires 30A, 30B are provided at their upper ends, in the region of ground plate 29, each with a gilded spring contact 32A, 32B, which, when measuring head 26 is in a fixed position, ensures a constant contact pressure of measuring wires 30A, 30B and of fusion ball 31A, 31B against respectively assigned contact surfaces of sample plate 12. Furthermore, the sheathings of measuring wires 30A, 30B, which are made of platinum, are fixed to supporting plates 33 and 34, which in turn are fastened to a rod assembly 35, and are aligned parallel to ground plate 29.

Spring contacts 32A, 32B are connected via lines 36A, 36B to SMB sockets 37A, 37B that are integrated into measuring head 26, and, in turn, are connected via shielded SMB lines 38A, 38B to measuring and evaluation unit 18 of device 10.

Altogether, measuring head 26 has 128 SMB sockets 37A, 37B, of which each is connected to a measuring wire 30A, 30B and to which, in each case, one SMB line 38A, 38B is connected, that leads to measuring an evaluation unit 18. However, for clarity's sake, in FIGS. 1 to 3, in each case, only two SMB sockets 37A, 37B and two SMB lines 38A, 38B are shown, as well as measuring wires 30A, 30B that are allocated in each case.

Furthermore, measuring head 26 has a gas distribution device 39, made, for example, of quartz glass and essentially bell-shaped, which is shown in detail in FIG. 4 and which is connected via a gas supply line 40, made of high-grade steel, to gas supply unit 16. Bell-shaped gas distribution device 39 borders on a gas chamber that is situated above the 64 material samples 13 that are disposed on sample plate 12.

Material samples 13 are formed, for instance, of tin oxide $SnO_2$, and have different dopings which are formed, for example, of lanthanides. Material samples 13 are distributed in a matrix-like manner, in eight rows and eight columns, on sample plate 12.

Gas distribution device 39, that is shown in detail in FIG. 4, also has in its gas chamber 41 a diffuser insert 42, formed of a quartz ball and has a plurality of bore holes 43 that each have a diameter of about 1 mm.

In order to manage a uniform gas outflow from gas chamber 41, bell-shaped gas distribution device 39 has at its edges spacers 430, which establish a gap of 0.8 mm in width between gas distribution device 39 and sample plate 12.

In order for gas chamber 41, and therewith material samples 13, to have different test gas atmospheres applied to them, gas supply unit 16 has two gas bottle cabinets, not shown here in detail, each having four gas bottles, which are respectively connected to a gas flow controller 44A, 44B, 44C, 44D, 44E, 44F, 44G and 44H, one gas bottle containing moist synthetic air, the second gas bottle containing hydrogen, the third gas bottle containing methane, the fourth gas bottle containing synthetic air, the fifth gas bottle containing nitrogen dioxide, the sixth gas bottle containing nitrogen monoxide, the seventh gas bottle containing propene and the eighth gas bottle containing carbon monoxide. The capacities of flow controllers 44A, 44B, 44C, 44D, 44E and 44F are respectively between 0 sccm and 100 sccm. The capacities of flow controllers 44G and 44H are respectively between 0 sccm and 10 sccm. By appropriate control of the volume flow of the various gases, using the group of uniform devices, coming from the eight gas flow controllers 44A, 44B, 44C, 44D, 44E, 44F, 44G and 44H test gases of different compositions may be fed into a collecting line 45 that is connected to gas supply line 40.

In order to set a relative humidity of the respective test gases, the test gas may have admixed to it a moist carrier gas, consisting, for example, of synthetic air. The moisture in the carrier gas is set by bubbling it through a water reservoir 46. Measuring the humidified carrier gas using a moisture sensor, not shown here in greater detail, yields, for example, a relative humidity of approximately 90% at room temperature.

Measuring and evaluation unit 18 includes two relay switch panels 50 and 51, to which respectively 64 lines 38A, 38B are connected that lead to measuring head 26 of high temperature reactor 14. Relay switch panels 50 and 51 each form a 3×64 matrix of relays suitable for high-frequency.

Relay switch panels 50 and 51 are connected to a measuring and evaluation computer 53 via a digital control line 52. Moreover, relay switch panels 50 and 51 are connected to an impedance analyzer 64 and a so-called source meter 55, via measuring lines 54. These two measuring unite are also connected to measuring and evaluation computer 53 via digital control line 52. The addressing of impedance analyzer 54 and source meter 55 takes place via the two relay switch panels 50 and 51.

Measuring and evaluation computer 53 is also connected via an additional digital control line 56 to a D/A-A/D converter 57, which is connected via an analog control line 58, on the one hand, to heating block 22 of high temperature reactor 14, and, on the other hand, to gas flow controllers 44A, 44B, 44C, 44D, 44E, 44F, 44G and 44H of the gas supply unit (or gas mixing battery) 16.

On measuring and evaluation computer 53, a modular measuring and control software is filed, which makes possible, via a script control, a complete automation of measurements carried out using device 10. Because of the modular design of the measuring software and control software, a broadening of the measurement system is possible without a problem.

Using source meter 55, direct current resistances, U/I characteristics lines or voltages of individual material samples 13 may be measured. These values, as well as the measured values ascertained using impedance analyzer 54, may be passed on via digital control line 52 to measuring and evaluation computer 53, which includes a databank for the measured data.

In order to measure material samples 13, that are disposed on sample plate 12, in a high throughput mode or according to a high throughput method, via a script data file is used, a list of tasks that is made up of index key words and parameters being passed over, via a script data file, to the software, using which the script data file is processed and which controls all the functions of the system. The script data files ensure a continual checking of control parameters, so that measurements under faulty measurement conditions are excluded in that a further processing of the script data file is suspended. There is no limit with regard to the length of the script data file.

Figure 5:
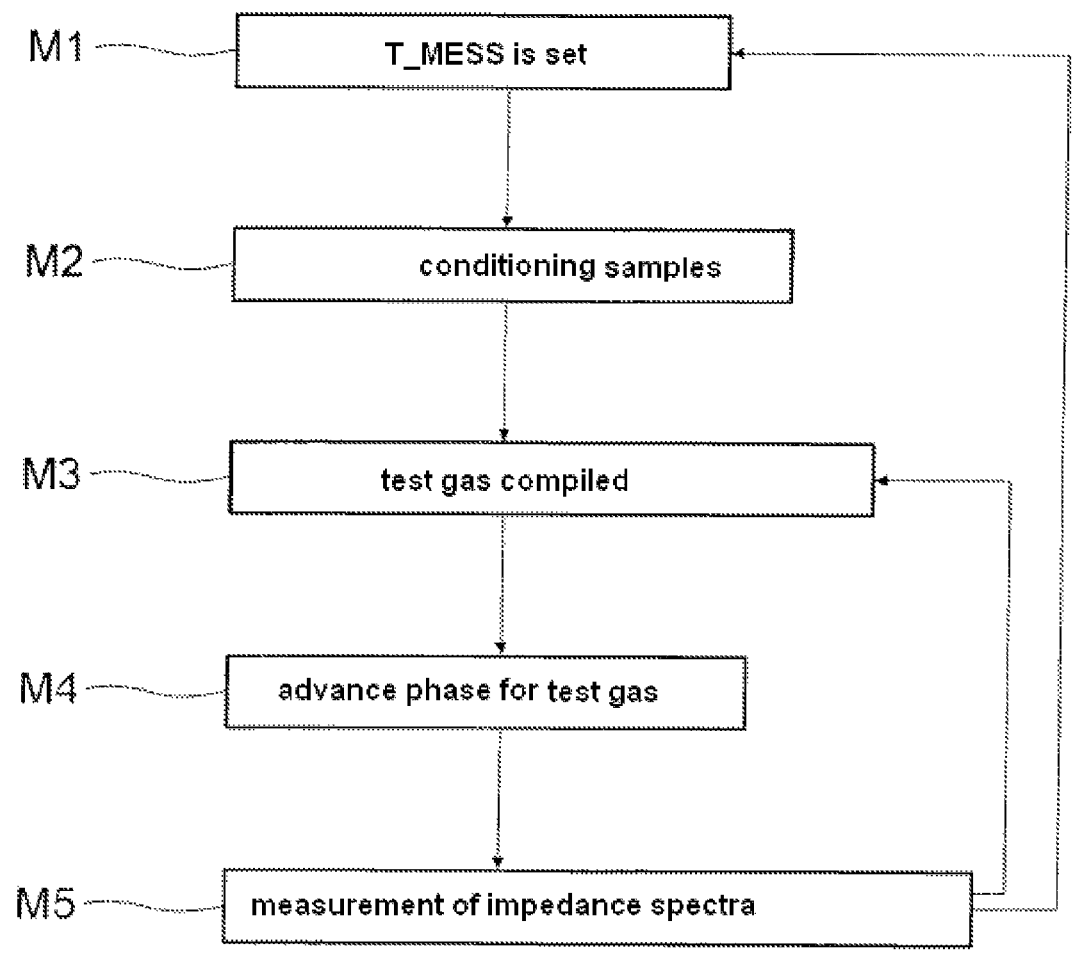
FIG. 5 is a flowchart illustrating a measuring sequence

A measuring sequence able to be carried out using the device according to FIG. 1 is shown in FIG. 5 in the form of a flow chart. For the analysis of resistive gas sensor properties, material samples 13 of sample plate 12 are first electrically characterized under a reference gas atmosphere which, for example, is formed of synthetic air of a relative humidity such as 45%, and under various test gas atmospheres. By a modulation of the measuring temperature, data may be gathered on the influence of the respective operational temperature on the material samples that are suitable as sensor material, as well as on the activating energy of conductivity processes.

In order to ensure comparability of measured data of several sample plates, the script data file used is designed as standard script which controls the complete high throughput screening, whose chronological sequence is described in the flow chart shown in FIG. 5. In this instance, in a first method step M1, a measuring temperature T_MESS of sample plate 12 is set. Measurements may be carried out, for example, in a temperature range between 400° C. and 250° C., in steps of 50°. During the cooling-off phases, sample plate 12 has applied to it a reference gas of synthetic air having a relative humidity of 45%.

Figure 7:
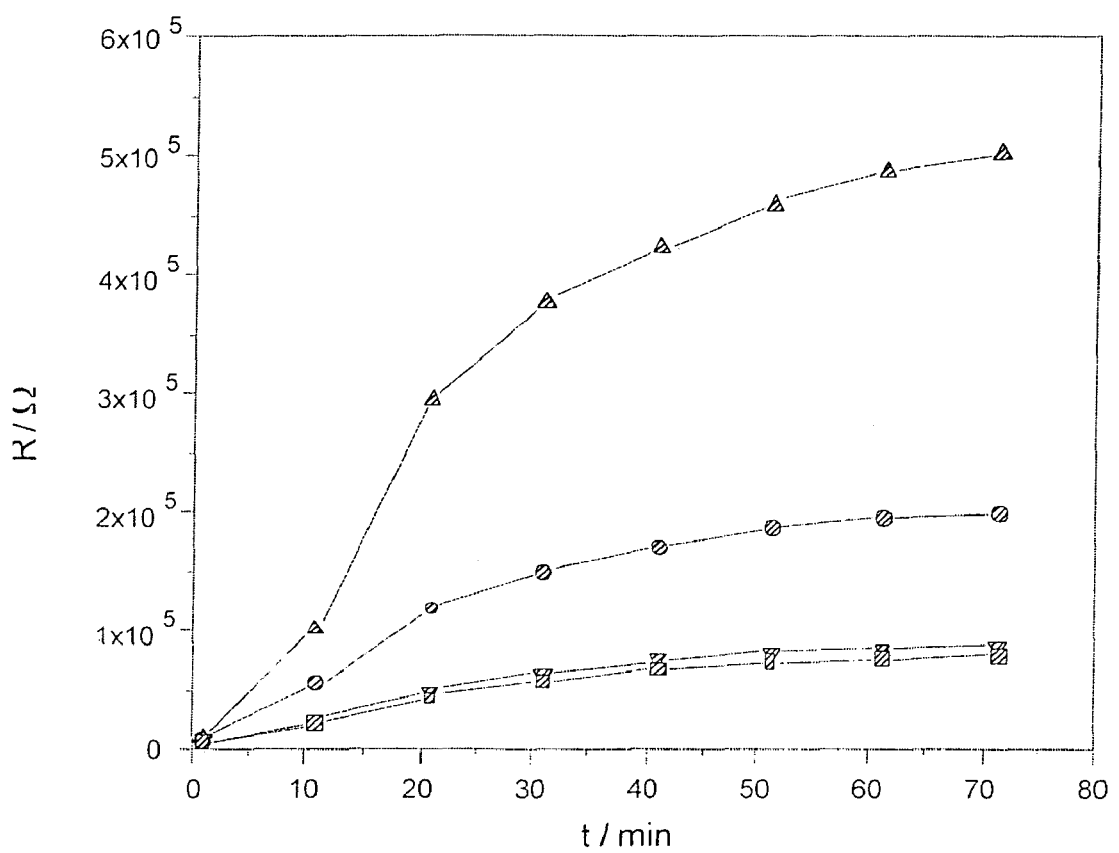
FIG. 7 shows a diagram in which an influent behavior is shown for four different surface doped material samples.

When there is a change in the sample temperature, a stable base resistance of the material samples first sets in after a certain time, so that conditioning of the material samples in a step M2 is required. Temperature changes in the material samples lead to a metastable state of intrinsic defects, which may represent oxygen vacancies, and whose thermodynamic equilibrium setting may require a finite time. FIG. 7 shows in an exemplary manner the conditioning behavior or influent behavior for four different surface-doped $In_2O_3$ samples upon reaching a target temperature of 300° C. Resistances R of the samples approach a boundary value, asymptotically with time, which represents the so-called base resistance or reference resistance. This boundary value is reached, as extrapolated, after about 90 minutes. To ensure a constant reference resistance, it is of advantage to select a conditioning time of 120 minutes.

Subsequently, the test gas required for the measurement is put together in a method step M3, and is introduced into gas chamber 41 above sample plate 12. The first test gas includes, for instance, hydrogen at a concentration of 25 ppm. Synthetic air acts as the carrier gas. The gas flow is set to 100 sccm using moist synthetic air.

Figure 8:
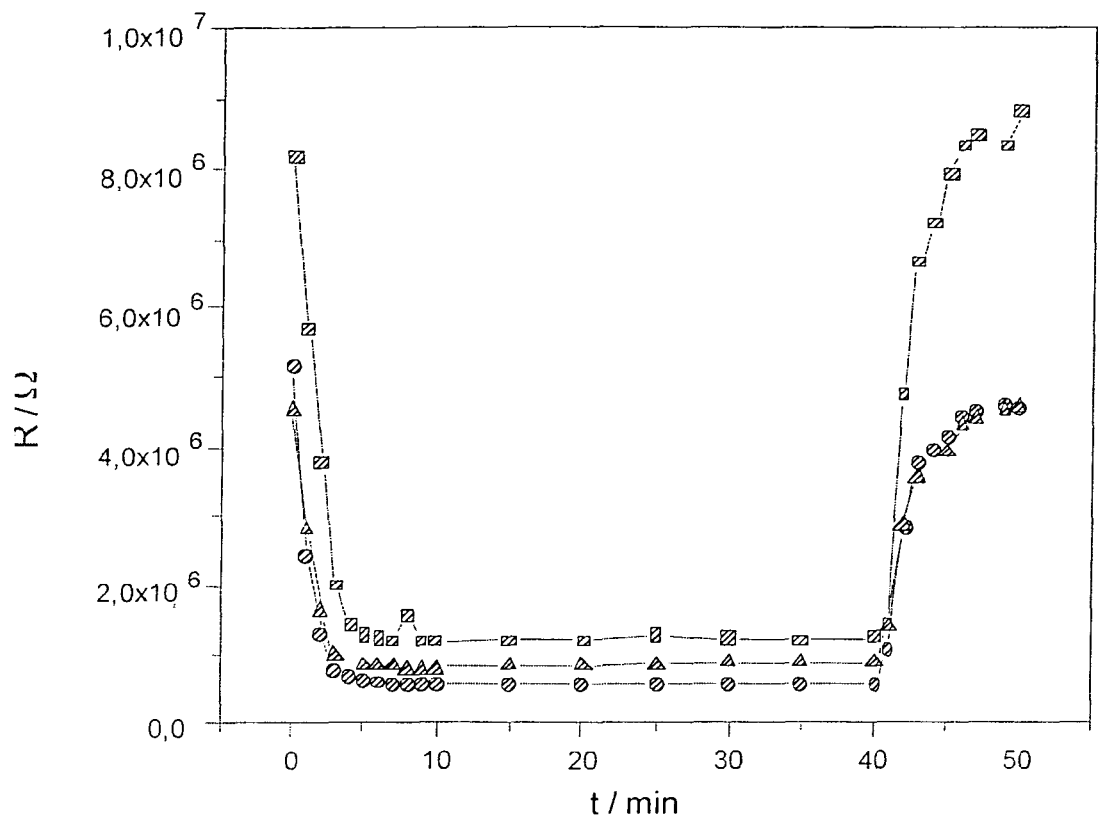
FIG. 8 shows a diagram in which a response time performance is shown for three different material samples during a test gas pulse.

In order to ensure that the individual material samples have reached their base resistance independent of their relative position on the sample plate, there subsequently takes place, in a step M4, an advance phase for the test gas that was analyzed before. FIG. 8 shows the resistance pattern of three material samples lying on a diagonal of the sample plate, during a test gas pulse lasting 40 minutes, the pulse gas containing propane at a concentration of 50 ppm. The base material of the material samples is tin oxide $SnO_2$ in the example shown in FIG. 8, because of its great sensitivity to hydrocarbons. Independently of the relative position on the sample plate, the resistance of the material samples decreases, because of the test gas pulse, to a constant value, within approximately 6 minutes. Thus, the response time amounts to 6 minutes in each case, the response behavior being essentially independent of the position of the respective material sample on the sample plate. After terminating the test gas pulse, the resistances tend asymptotically to the base resistances within approximately 10 minutes. Accordingly, the response behavior is essentially independent of the position of the material sample on the sample plate. The advance time, selected for the script data file, of each test gas or reference gas amounts to about 15 minutes before the corresponding measurement.

In a subsequent method step M5, there takes place the measurement of impedance spectra for the 64 material samples disposed on the sample plate. In this context, in the script data file, for the measurements of the impedance spectra, the following are established as parameters:

| | |
|---|---|
| amplitude of the measuring voltage [V] | 0.1 |
| starting frequency [Hz] | 10 |
| ending frequency [Hz] | $10^7$ |
| measuring points per frequency decade | 15 |
| bias [V] | 0 |
| mode [HS: highs peed; NO: normal; AV: average] | HS |

The measuring data obtained are ascertained using impedance analyzer 64 and passed on to measuring and evaluation computer 53 or the databank filed on it.

Thereupon the measurement may be carried out under another test gas atmosphere, in this instance, once again the program runs through steps M4 and M5. For example, as further test gases, carbon monoxide at a concentration of 50 ppm, nitrogen monoxide at a concentration of 5 ppm, nitrogen dioxide at a concentration of 5 ppm or propane at a concentration of 25 ppm may be used.

The entire screening may then be carried out by looping back to step M1 at another measuring temperature.

Figure 6:
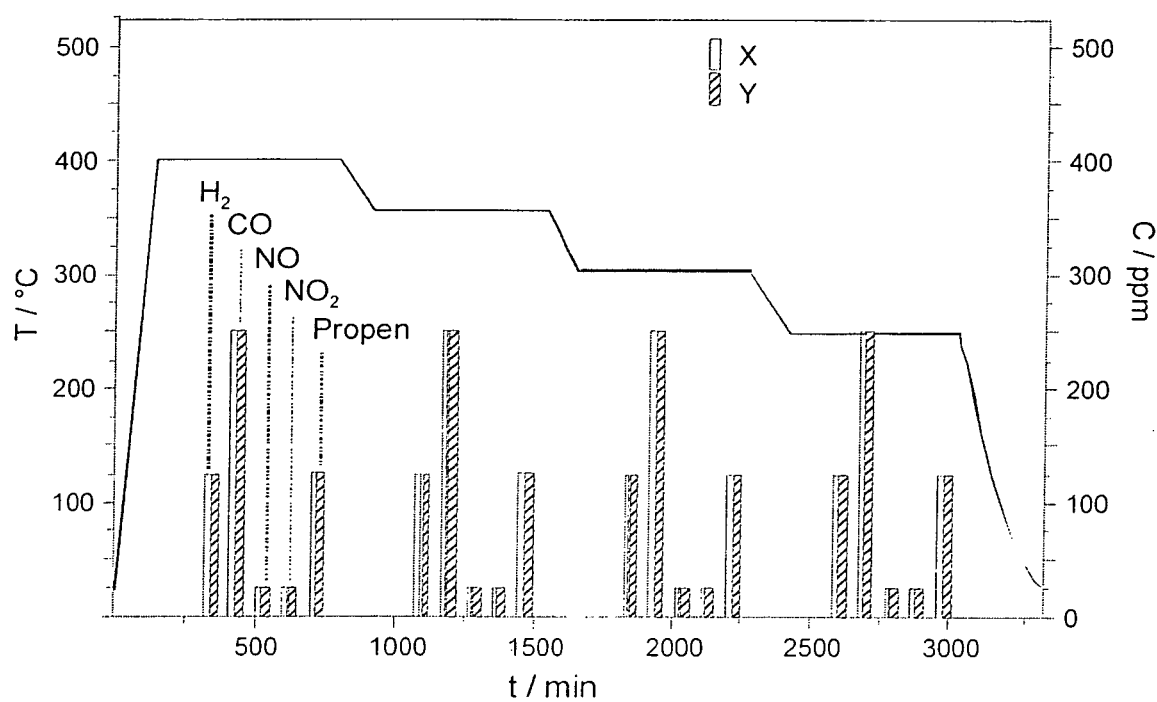
FIG. 6 shows a diagram representing a measuring sequence over time for material samples at various temperatures and under various gas atmospheres.

FIG. 6 is a diagram that illustrates a measuring sequence determined by a standard script, measurements under reference conditions and during conditioning phases not being shown for the sake of clarity in this diagram. Measurements under reference conditions, i.e., under a reference gas atmosphere, are always carried out before the initiation of a new test gas $H_2$, CO, NO, $NO_2$, or propene at the appropriate temperature T. There is always respectively a so-called test gas advance phase X and a measuring phase Y. Furthermore, the respective concentrations C of the test gases are shown in FIG. 6.

The measuring and evaluation software may have a functionality on which the respectively measured impedance spectrum is graphically shown on a monitor. The measured data, which may be stored in ASCII format in the databank or in the index assigned to the sample plates on the measuring and evaluation computer, are consequently directly accessible to visual control.

Furthermore, the measuring and evaluation software may be furnished with a functionality which shows the impedance spectra of the sample materials of a sample plate as an image matrix independently of position. In this context, raw data as well as derived data may be shown. The functionality may also include an evaluation window to which the data of a certain material sample may be transmitted. The functionality may also be combined with additional image-producing measuring or evaluation systems. Image data from these systems may then also be read into the image matrix independent of position, in order thus to be able to obtain further data on the samples.

Figure 9:
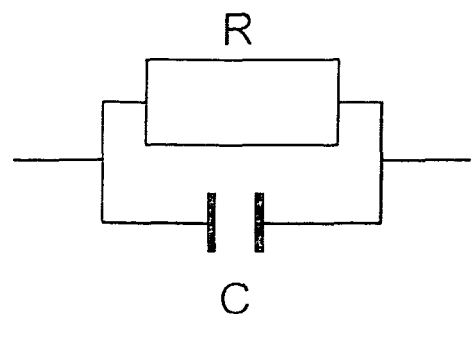
FIG. 9 shows a circuit equivalent.

After measuring the impedance spectra for the individual material samples, a theoretical impedance spectrum based on circuit equivalents is computed for each material sample. In the present case, the circuit equivalent is made up of a serial connection of four RC elements of the kind shown in FIG. 9. The theoretically calculated impedance spectra, in this context, are each adapted as well as possible to the correspondingly measured impedance spectrum, namely, by varying the magnitudes or dimensionings of the individual components of the circuit equivalents.

Figure 10:
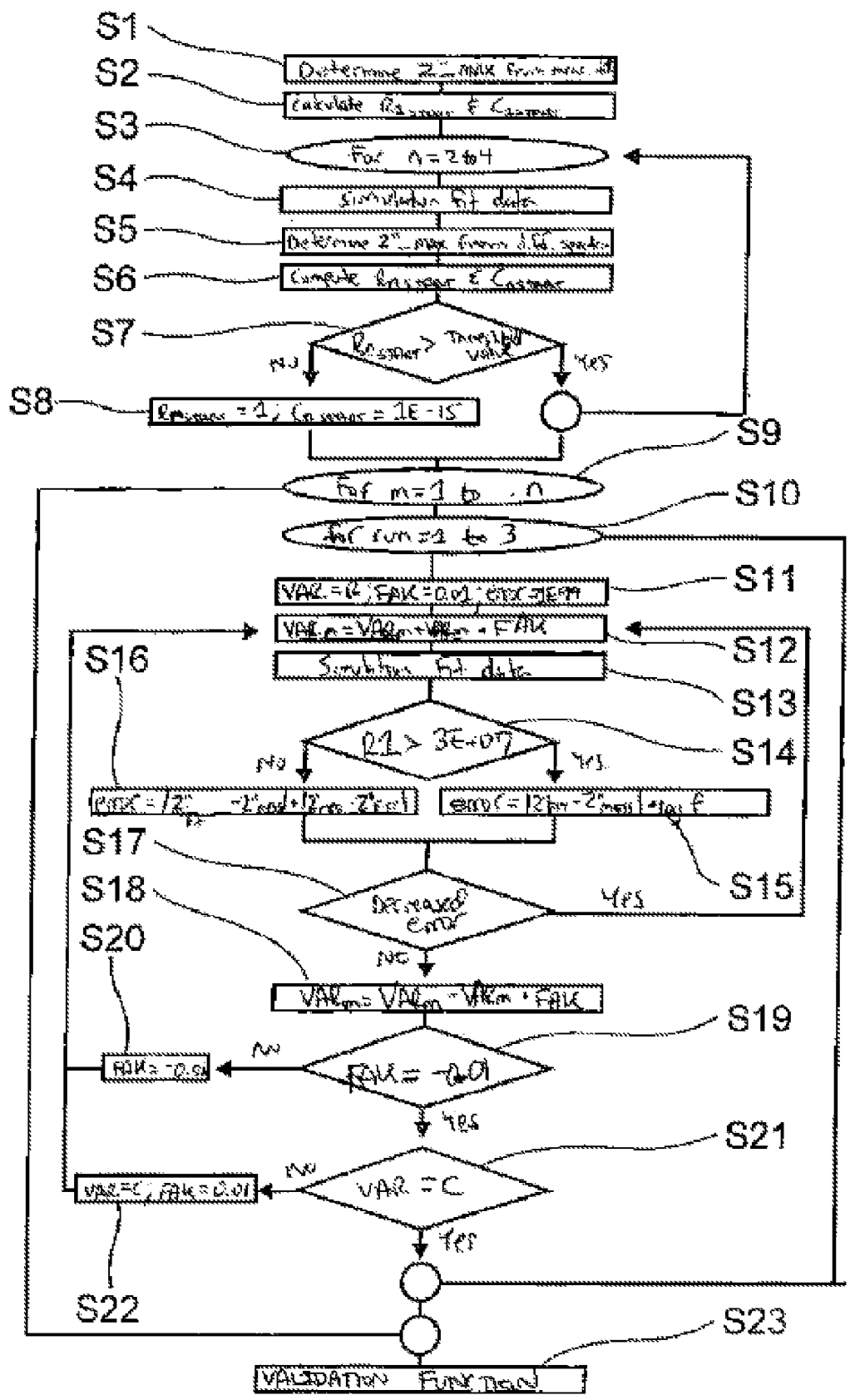
FIG. 10 shows a flow diagram of an error minimization computation.

This is clarified in the following with reference to the error minimization computation in the light of the flow chart shown in FIG. 10.

In order to carry out the error minimization computation, it is necessary to determine starting values for the individual components of the circuit equivalents. At the same time, it is necessary to determine the number of RC elements to be taken into consideration in the error minimization computation. For these purposes, in a step S1, the maximum imaginary impedance Z"_MAX is ascertained from the measured data for the respective material sample. In the selection, it is also judged whether, in the case of the maximum measured imaginary impedance, a fault measurement is involved, which is done by an investigation of the imaginary impedances measured at adjacent measuring points, i.e., by an investigation of the local maximum.

Subsequently, in a step S2, starting values R1_START, for the resistance, and C1_START, for the capacity of the first RC element, are calculated based on Z"_MAX and the corresponding measuring frequency, according to formulas $$R1\_START = -2 \cdot Z''\_MAX$$

$$C1\_START = \frac{1}{2\pi \cdot f\_Z''\_MAX \cdot R\_START}$$

where $f\_Z''\_MAX$ is the measuring frequency for the maximally measured, imaginary impedance.

Subsequently, in a step S3, starting values for the resistances and capacitances of the additional three RC elements of the circuit equivalents are ascertained.

To do this, first of all, in a step S4, based on starting values R1_START and C1_START, a theoretical impedance spectrum is calculated, and, in a step S5, a difference spectrum between the theoretical impedance spectrum and the measured impedance spectrum is calculated, and from this difference spectrum, in turn, the maximum of the imaginary impedance $Z''\_MAX$ is ascertained. Starting from this maximum, in a step S6, the starting values Rn_START and Cn_START (n=2 to 4) are then calculated for the respective RC element being examined, according to the formulas explained in connection with step S2.

Thereafter, in a step S7, a threshold value examination is carried out for calculated resistance starting value Rn_START, using which, it is determined whether the respective RC element should be taken into consideration in the subsequent simulation calculations. The threshold value is a value that may be changed by the user. In the comparison, the percentage ratio of the resistance of the first RC element to the resistance of the current component is checked.

If the calculated starting value Rn_START is greater than the threshold value, the RC element is taken into consideration, the system goes back to step S3, and a calculation of the starting values Rn_START and Cn_START is undertaken for the next RC element. If the argument is not satisfied, the magnitudes of the components of the higher RC elements are set to values that have no influence on a simulation calculation for an impedance spectrum. In subsequent adaptation steps, these values remain constant, and they amount, for example, to Rn_START=1 and Cn_START=$10^{-15}$. This determination takes place in a step S8.

Thus, the threshold value query determines the number of the RC elements that are to be taken into consideration in the following steps. If the threshold value is undershot, the system transfers directly to the error minimization computation based on the number of RC elements determined, for instance, based on an RC element, in this case, a loop starting with step S9 being executed over all m RC elements taken into consideration.

Within loop starting with step S9, an additional loop starting with step S10 is included, in which runs 1 to 3 are executed, in this case an empirical number of run-throughs being involved, which are carried out to increase the accuracy of the error minimization computation.

Within loop S10, first of all, in a step S11, resistance value R1_START of the first RC element is drawn upon as variable VAR. The variation of the individual components in the error minimization computation amounts to 1%, which is expressed by a value FAK=0.01 in step S11. The error is preset to $10^{99}$. The variation of the respective component takes place in a step S12, according to formula VAR=V·FAK. A calculation of a theoretical impedance spectrum then takes place, based on the varied value, in a step S13.

After that, an error is calculated which is based on a comparison between the impedance spectrum calculated for the correspondingly adapted component variables and the measured impedance spectrum. A function for determining the error is dependent on the starting value of the resistance of the first RC element. In order to calculate the error, in a step S14 it is checked whether the respective starting value is greater than the nominal measuring resistance of the impedance analyzer used, for example, greater than $3\times10^7$ Ω. If this is so, the error is determined in a step S15, only by examining the imaginary parts of the impedance, according to the formula $$error=|Z''\_fit-Z''\_mess|\cdot \log f$$

for the weighting of the high-frequency range of the spectrum a multiplication being made by the logarithm of the measuring frequency, whereby physically meaningless or erroneous measured data in the low-frequency range are suppressed. Otherwise, in a step S16 an error examination is made, based on both the real parts and the imaginary parts of the impedances according to the formula $$error=|Z''\_fit-Z''\_mess|+|Z'\_fit-Z'\_mess|.$$

In a step 17, the system checks whether the error has become smaller because of the variation of the component in step S12. If this is the case, the respective component, for instance, the resistance of the respective RC element, is varied once more by going back to step S12. If the error has not gone down, the variation that has taken place in step S12 is reversed in a step S18, and, in a step S19 it is established whether the sign of the variation will be changed in a step S20, or whether, in a step S21 and a subsequent step 22, the next component, in this case the capacitance C, will be selected as the variable component. In this case, then, there is once more a return to step S12, the magnitude of the component is then again varied as long as the error is decreasing.

The variation of the resistance and the variation of the capacitance are repeated by return to step S10 twice for each RC element. Thereafter, as a function of the number of the RC elements, that are to be taken into consideration, there is an n-fold return to step S9.

If no further minimization of the error is possible by variation of the resistance and the capacitance of the RC element, the values for the resistance and the capacitance yielding the smallest error are output as evaluation variables of the error minimization computation.

At the close of the error minimization computation taking place in steps S9 to S22, in a step S23, a validation function is ascertained for the theoretically determined impedance spectrum, by which the quality of the theoretically calculated spectrum may be estimated. Upon determination of the validation function, for the estimation of a quality of the error minimization computation a corridor is ascertained, around the calculated impedance spectrum, that includes 90% of the measured data. The error thus ascertained lies between 0 and 1, an error of 0 expressing an ideal agreement of the measurement and the simulation calculation, and an error of 1 expressing no agreement of the measurement and the simulation calculation.

Figure 11:
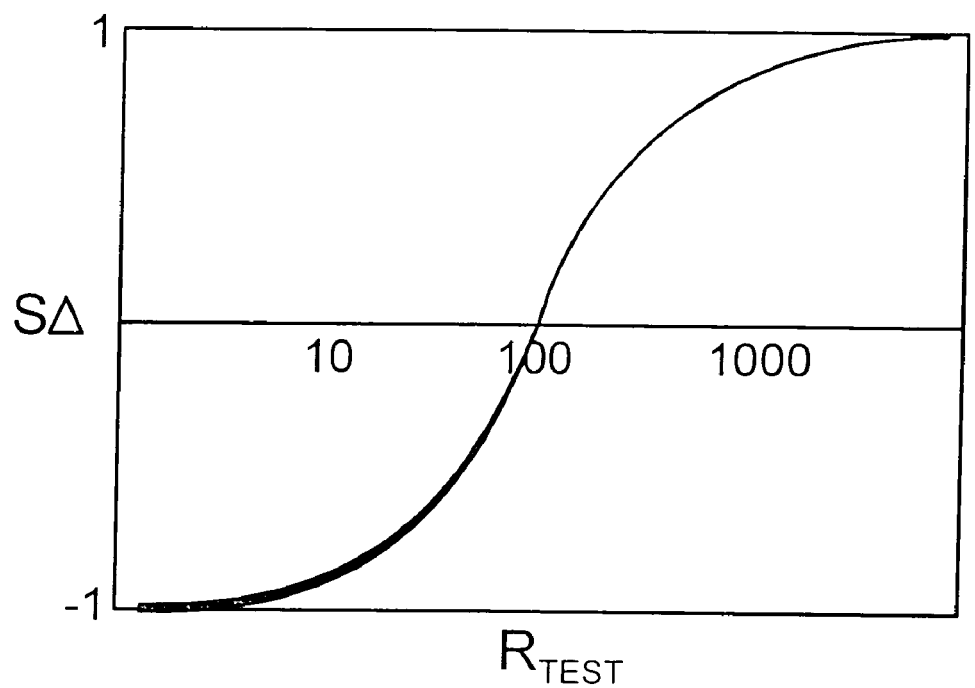
FIG. 11 shows an exemplary curve of the sensitivity of a material sample.

When using the method for establishing a sensor material of a gas sensor, sensitivities $S\_\Delta$ are calculated, based on resistances of the circuit equivalents obtained by the error minimization computation. Sensitivities $S\_\Delta$ thus obtained are normalized, and lie between −1 and +1, as may be seen in the diagram in FIG. 11. FIG. 11 shows sensitivities for an assumed reference resistance of 100 Ω, at varying test resistance R_test. Sensitivities $S\_\Delta$ are stored in the databank.

Figure 12:
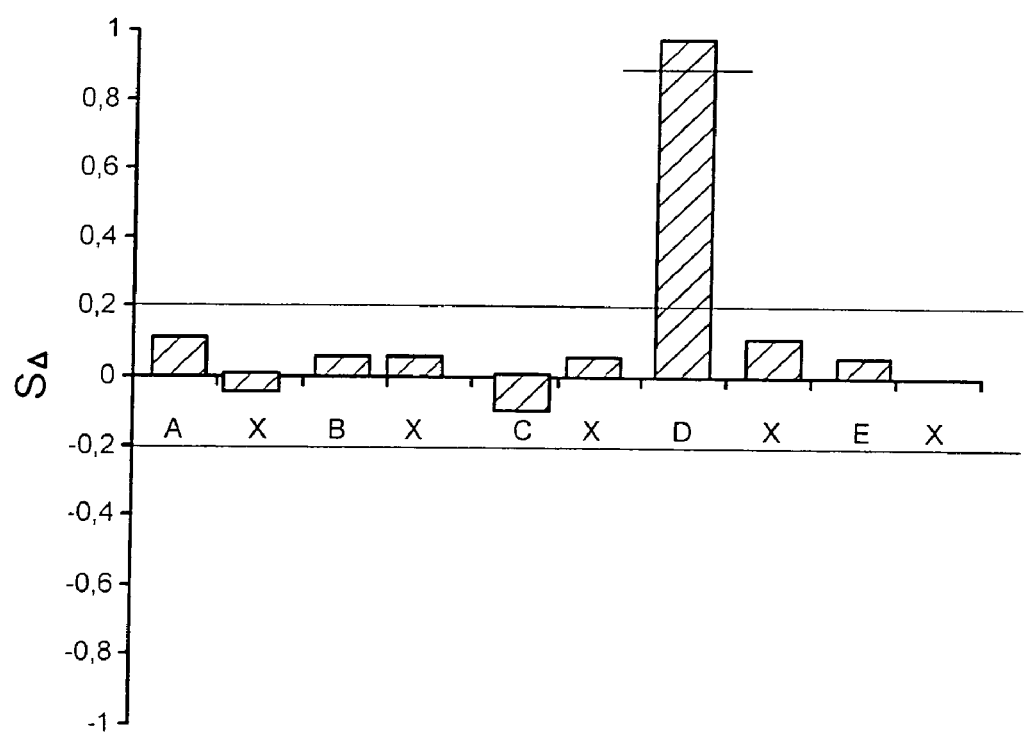
FIG. 12 is a graph illustrating an exemplary fingerprint of sensitivities of a material sample with regard to various gas atmospheres.

Subsequently, based on the ascertained sensitivities $S\_\Delta$, a numerical data-mining is carried out, so as to be able to select an optimal gas sensor for a special application case. The data-mining is carried out especially in a numerical way, the individual sensitivities S_Δ being accessed which are stored in the databank, classified by measuring temperature and test gas. It is first specified which properties are demanded of the desired sensor material. In the simplest case, it is stated for which test gas the sensor is to be used, and which cross-sensitivities will interfere. This yields a requirement profile on the fingerprint of the sensitivities, as shown in FIG. 12. The requirement profile is converted into so-called ">" or "<" requirements, whereby data sets having the desired properties are characterized. Additional conditions, such as the type-of base material of the sensor material or its surface doping may be taken up into the target function. In the example in FIG. 12, the requirement profile turns out so that all test gases A, B, C, E, except for test gas D, have a sensitivity less than 0.2 and greater than −0.2, and test gas D has a sensitivity greater than 0.9. In each case X states the reference. Using an evaluation functionality, the requirement profile is converted to an SQL filter scan and passed on directly to the databank. The results of the SQL instruction may then be shown in tabular form on a screen.

Figure 13:
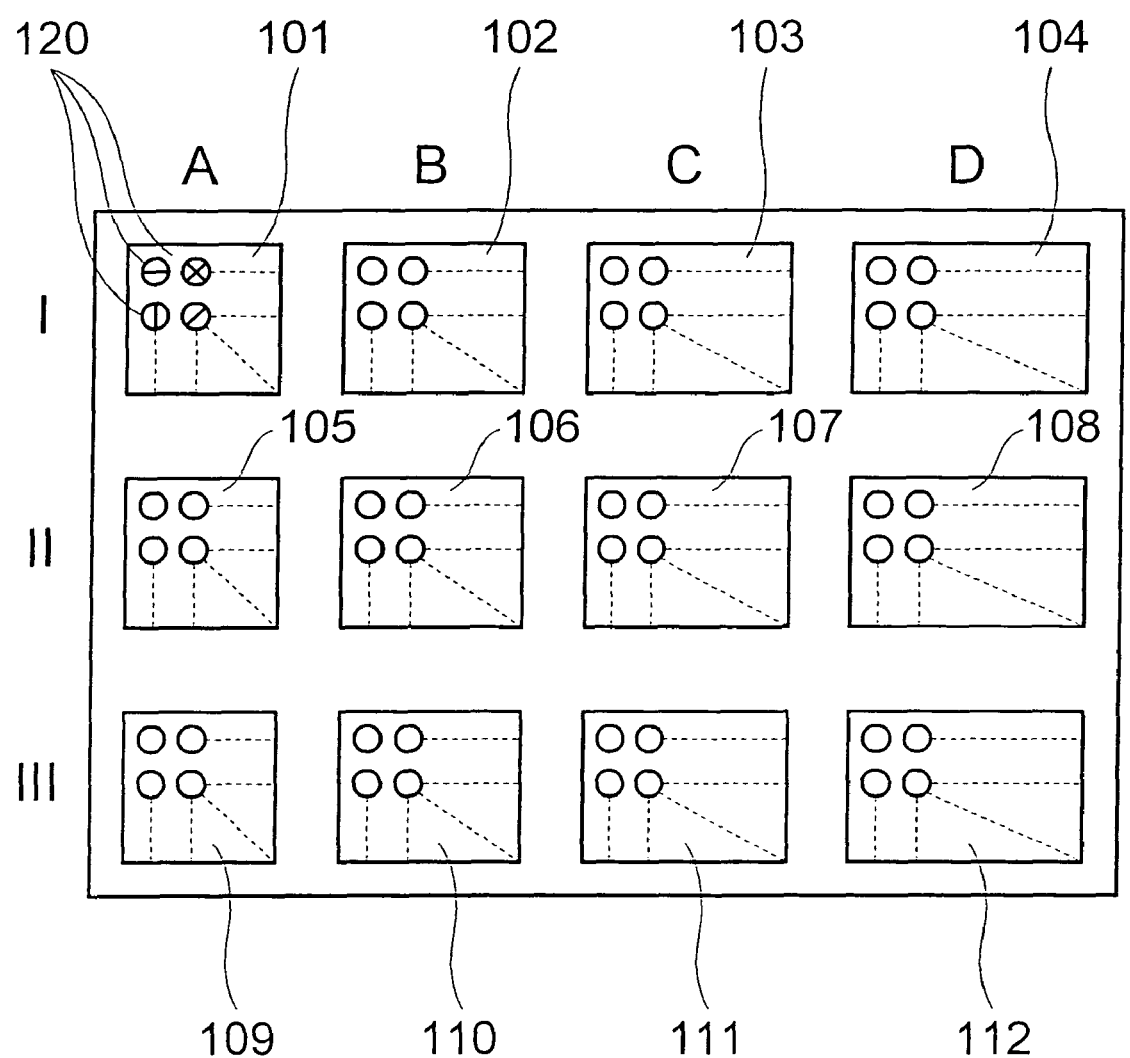
FIG. 13 shows a greatly schematized representation of a visual data-mining functionality.

Alternatively, or in addition, the sensitivities ascertained for the various material samples at the various measuring conditions may be evaluated using a visual data-mining functionality. In this functionality, which is shown in FIG. 13, sensitivities of so-called library plates are shown classified as to test gases and temperatures on a screen. In the exemplary representation as in FIG. 13, library plates 101 to 112 are shown for four temperatures A, B, C and D, and for three different test gases I, II and III. Each library plate 101 to 112 is assigned to one temperature A, B, C or D, and to one test gas I, II or III. Sensitivities S_Δ of the individual materials of library plates 101 to 112 are each shown according to their position on the sample plate as circles 120 and in an off-shade. In FIG. 13, for the sake of clarity, only four of the 64 material samples are shown for each library plate 101 to 112. Positive sensitivities S_Δ, for example, are shown in colors that go from black to yellow via red shades, whereas negative sensitivities are shown, for example, in colors that go from black to turquoise via blue tones. The diameter of individual circles 120 is determined by the validation of the error minimization computation, in the case of a large error, a small circle being shown, and in the case of a small error, a comparatively large circle being shown. Using this scheme makes an intuitive judgment of large data quantities possible for the user.

The data sets required for the functionality shown in FIG. 13 are extracted directly from the databank, so that the measurements to be shown may be selected via filter functions. The number of the data sets indicated is only limited by the working memory of the evaluation computer used.

Furthermore, it is possible in the visual data-mining functionality that additional data, concerning the individual material samples, may be indicated by the screen-supported selection of a certain circle.

What is claimed is:

1. A device for an analysis of at least two material samples disposed on a sample plate, the device including:
    a carrier for the sample plate;
    a contacting mechanism for electrical contacting of the at least two material samples;
    a housing carrier;
    a measuring head inserted into the housing carrier and connected to a gas supply unit, wherein the measuring head includes a gas chamber formed by a substantially bell-shaped distributing device for applying gas to the sample plate, wherein the bell-shaped distributing device is connected to the gas supply unit, wherein the measuring head includes two measuring wires per each material sample for achieving electrical connection to the contacting mechanism, wherein the measuring wires lie against contact surfaces of the sample plate with prestressing, and wherein the measuring wires are connected to a measuring and evaluation unit.

2. The device as recited in claim 1, wherein the measuring wires are connected to fusion balls which function as the contacting mechanism that lies against the contact surfaces of the sample plate.

3. The device as recited in claim 2, wherein the measuring wires are each connected to a spring contact which ensures a constant contact pressure of the respective measuring wire on the respective contact surface of the sample plate.

4. The device as recited in claim 1, wherein the gas supply unit is connected to a data processing unit of the measuring and evaluation unit.

5. The device as recited in claim 1, wherein the gas supply unit includes a gas mixing device.

6. The device as recited in claim 1, wherein the gas supply unit includes a water reservoir.

7. The device as recited in claim 1, wherein a diffuser is situated in the gas chamber.

8. The device as recited in claim 1, wherein the gas chamber is provided with a gas outlet which is formed by at least one spacer element situated between the sample plate and the distributing device.

9. The device as recited in claim 1, wherein the measuring and evaluation unit includes two relay switch panels connected to the measuring wires, and wherein each relay switch panel has a 3×64 matrix made up of high-frequency relays.

10. The device as recited in claim 1, wherein the measuring and evaluation unit includes an impedance analyzer.

11. The device as recited in claim 1, wherein the measuring and evaluation unit is provided with a measuring and control software which transmits data to a relational databank that is linked to an evaluation software.

12. The device as recited in claim 11, wherein the evaluation software implements a fit functionality for calculating theoretical impedance spectra for a selected individual material sample, wherein the calculation takes place based on a circuit equivalent that includes at least one electronic component.

13. The device as recited in claim 12, wherein the evaluation software includes a data-mining functionality.

14. The device as recited in claim 13, wherein the data-mining functionality is implemented by application of multi-dimensional target functions.

15. The device as recited in claim 14, wherein the data-mining functionality includes a visualizing functionality.

16. The device as recited in claim 1, further comprising:
    a heating device, wherein the sample plate is configured to be inserted into the heating device.

17. A method for performing an analysis of at least two material samples disposed on a sample plate, the method including:
    measuring an impedance spectrum for each of the material samples;
    storing the measured impedance spectra in one of a data file and a data bank;
    determining a configuration of a circuit equivalent as a function of the respective measured impedance spectrum for each of the material samples, the respective circuit equivalent including at least one of a resistor and a resistor-capacitor combination element;
    determining a starting value required for an error minimization computation for each component of the respective circuit equivalents;

calculating a theoretical impedance spectrum for at least one selected material sample using the error minimization computation, based on the impedance spectrum measured for the at least one material sample and on the starting values for the components of the respective circuit equivalent;

determining fit values for the components of the respective circuit equivalent;

determining a validation magnitude for the calculated, theoretical impedance spectrum; and determining an evaluation variable by a comparison of at least one of the fit values for the components of the respective circuit equivalent to a reference value.

18. The method as recited in claim 17, wherein a number of resistor-capacitor combination elements connected in series is determined by taking into consideration a preselected threshold value, and wherein a maximum of four resistor-capacitor combination elements are connection.

19. The method as recited in claim 18, wherein the starting values for the components of a first resistor-capacitor combination element of the circuit equivalent are ascertained as a function of a maximally measured, imaginary impedance.

20. The method as recited in claim 17, wherein the error minimization computation is carried out by variation of a dimensioning of the individual components of the circuit equivalent by 1%.

21. The method as recited in claim 17, wherein in the error minimization computation, an error of the theoretical impedance spectrum is ascertained by analysis of a difference between the theoretical impedance spectrum and the measured impedance spectrum.

22. The method as recited in claim 17, wherein for each of the material samples, impedance spectra are measured at least one of under different test gas atmospheres and at different temperatures.

23. The method as recited in claim 17, wherein the evaluation variable for each material sample is written into a data bank, and a data-mining is carried out based on the evaluation variables stored in the data bank.

24. The method as recited in claim 23, wherein the data-mining is carried out using a target function.

25. The method as recited in claim 24, wherein the data-mining is carried out using a visual datamining functionality.

26. The method as recited in claim 17, wherein the measured impedance spectra are at least one of visually checked and evaluated using a control functionality.

* * * * *